United States Patent
Wang

(10) Patent No.: US 8,967,658 B1
(45) Date of Patent: Mar. 3, 2015

(54) FOLDING BALL TROLLEY

(71) Applicant: Chia-Ling Wang, New Taipei (TW)

(72) Inventor: Chia-Ling Wang, New Taipei (TW)

( * ) Notice: Subject to any disclaimer, the term of this patent is extended or adjusted under 35 U.S.C. 154(b) by 0 days.

(21) Appl. No.: 14/261,552

(22) Filed: Apr. 25, 2014

(30) Foreign Application Priority Data

Nov. 6, 2013 (TW) .............................. 102220675 U

(51) Int. Cl.
*B62B 1/00* (2006.01)
*B62B 3/02* (2006.01)

(52) U.S. Cl.
CPC ...................................... *B62B 3/025* (2013.01)
USPC ........................................... 280/651; 248/97

(58) Field of Classification Search
USPC ........ 280/37, 30, 35, 47.26, 47.33, 47.19, 42, 280/47.24, 644, DIG. 4, 652, 654, 651
See application file for complete search history.

(56) References Cited

U.S. PATENT DOCUMENTS 8,220,824 B2 * 7/2012 Chen et al. ..................... 280/651
2006/0032992 A1 * 2/2006 Rosheuvel ...................... 248/97

* cited by examiner

*Primary Examiner* — John Walters
*Assistant Examiner* — James Triggs
(74) *Attorney, Agent, or Firm* — Rosenberg, Klein & Lee

(57) ABSTRACT

A folding ball trolley has a frame and a bag. The frame has two main rod assemblies and two connecting rod assemblies. When the folding ball trolley is expanded, the main rods and the connecting rods lean outward under gravity until the main rods brace the bag. The bag holds the main rods at a specific angle, and the main rods hold the connecting rods at a specific angle. The main rod assemblies and the connecting rod assemblies are connected into a rectangle, such that the frame is expanded horizontally when the rods are leant outward. Thus, the folding ball trolley can achieve auto expansion without any resilient element, and therefore a user does not have to resist the resilient force when folding. Besides, the amount of the rods is reduced to eight (four main rods and four connecting rods), which reduces the manufacturing cost and facilitates ease of assembly.

18 Claims, 12 Drawing Sheets

FOLDING BALL TROLLEY

CROSS-REFERENCE TO RELATED APPLICATIONS

This application is based upon and claims priority under 35 U.S.C. 119 from Taiwan Patent Application No. 102220675 filed on Nov. 6, 2013, which is hereby specifically incorporated herein by this reference thereto.

BACKGROUND OF THE INVENTION

1. Field of the Invention

The present invention relates to a folding ball trolley, especially to a folding ball trolley that has reduced rods and thus has lowered manufacturing cost and is easy to be assembled.

2. Description of the Prior Arts

A ball trolley is common in sports arenas, such as a gymnasium, for containing multiple and various kinds of balls, such as volleyballs, basketballs and so on. A user can conveniently move the ball trolley with the balls placed in it, or the user can take out the balls continually from the ball trolley for use.

A conventional trolley ball is disclosed in Taiwan utility model patent No. M459001, which is also disclosed in U.S. patent application Ser. No. 13/888,453. Both are incorporated herein as reference. With reference to FIG. 12, the conventional trolley ball comprises a frame 91, a bag 92 and two springs. The frame 91 has four stand rods 911, four top seats 912, four sliding seats 913, four connecting rod assemblies 914, and four mounting rods 915. The top seats 912 are respectively mounted on top ends of the stand rods 911. The sliding seats 913 are respectively mounted movably on the stand rods 911. Each connecting rod assembly 914 is mounted between two adjacent stand rods 911, and has two connecting rods 9141. The mounting rods 915 respectively and pivotally connect to the top seats 912. The bag 92 is mounted on the mounting rods 915. The springs are mounted on two diagonally opposite corners of the frame 91, and two ends of each spring respectively connect to the top seat 912 and the sliding seat 913 on the same stand rod 911. Thus, the spring pushes up the sliding seat 913 into position, and the moving of the sliding seat 913 rotates the connecting rod assemblies 914, thereby extending the distance between two adjacent stand rods 911.

However, the conventional ball trolley has the following shortcomings.

First, the conventional ball trolley has too many components. The four stand rods 911, the four connecting rod assemblies 914, and the four mounting rods 915 comprise sixteen rods in total, which increases the manufacturing cost and time spent in assembling.

Second, the conventional ball trolley needs springs to maintain the bracing condition of the ball trolley. However, using springs also increases the manufacturing cost and time spent in assembling, and worse still, a user has to resist the resilient force of the springs when folding the ball trolley, which is very inconvenient.

Third, the sliding seats 913 slide relative to the stand rods 911 when the ball trolley is folded or expanded. But the sliding of the sliding seats 913 may be unsmooth due to various reasons, such as low manufacturing precision, rusting after long time of using, or angle deviation after impact. The unsmooth sliding causes the ball trolley hard to be folded or expanded.

To overcome the shortcomings, the present invention provides a folding ball trolley to mitigate or obviate the aforementioned problems.

SUMMARY OF THE INVENTION

The main objective of the present invention is to provide a folding ball trolley that has reduced rods and thus has lowered manufacturing cost and is easy to be assembled.

The folding ball trolley has a frame and a bag. The frame has two main rod assemblies, four top seats, four bottom seats and two connecting rod assemblies. When the folding ball trolley is expanded, the main rods and the connecting rods lean outward under gravity until the main rods brace the bag. The bag holds the main rods at a specific angle, and the main rods also hold the connecting rods at a specific angle. The main rod assemblies and the connecting rod assemblies are pivotally connected to each other into a rectangle, such that the frame is expanded horizontally when the main rods and the connecting rods are leant outward. Thus, the folding ball trolley as described can achieve auto expansion without any resilient element, and therefore a user does not have to resist the resilient force of the resilient element when folding. Besides, the amount of the rods is reduced to eight (four main rods and four connecting rods), which reduces the manufacturing cost and facilitates ease of assembly. In addition, the folding ball trolley can function without any sliding seat, thereby preventing unsmooth movement during expansion and folding of the folding ball trolley.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
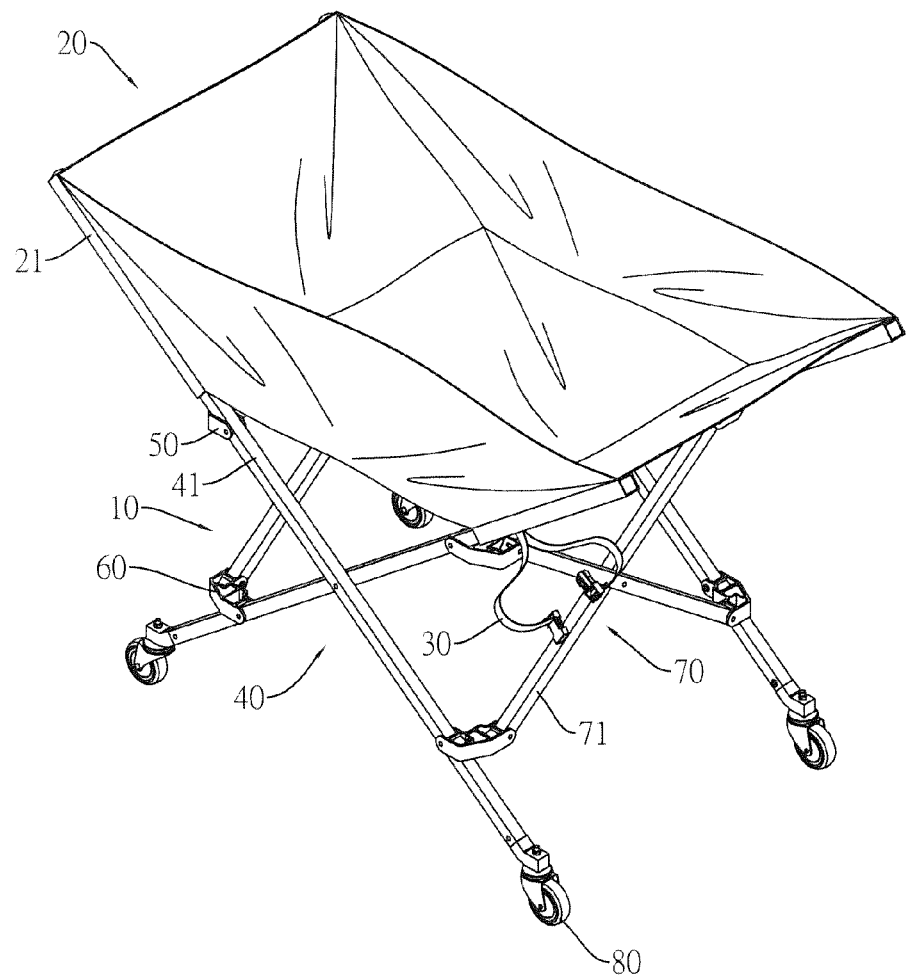
FIG. 1 is a perspective view of a folding ball trolley in accordance with the present invention.

With reference to FIG. 1, a folding ball trolley in accordance with the present invention comprises a frame 10, a bag 20, and a fastening belt 30.

Figure 2:
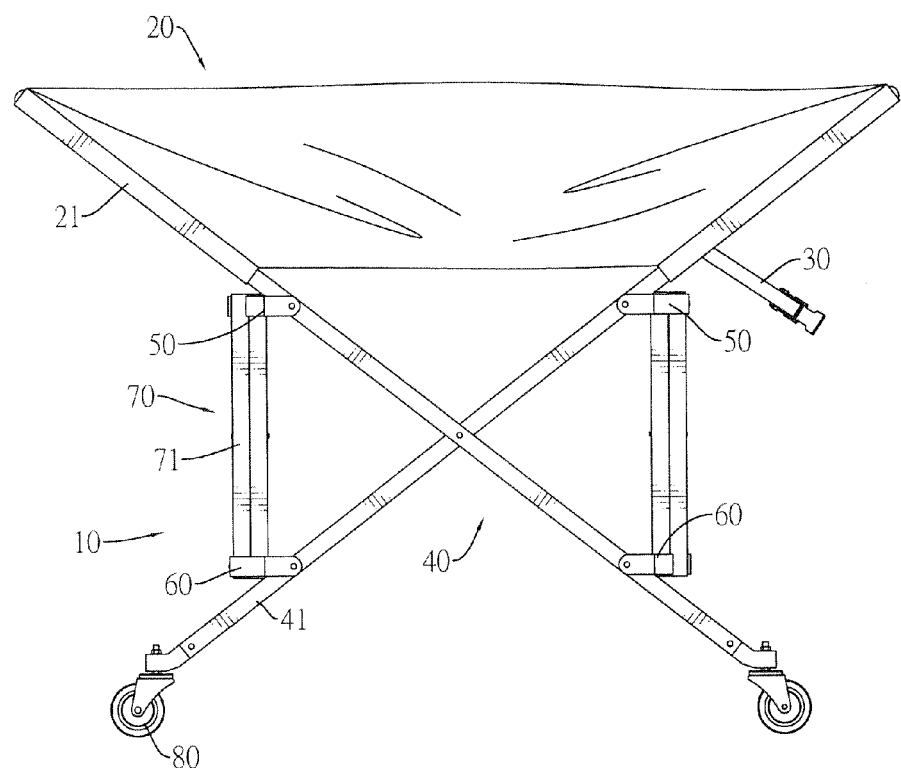
FIG. 2 is a front view of the folding ball trolley in FIG. 1.
Figure 3:
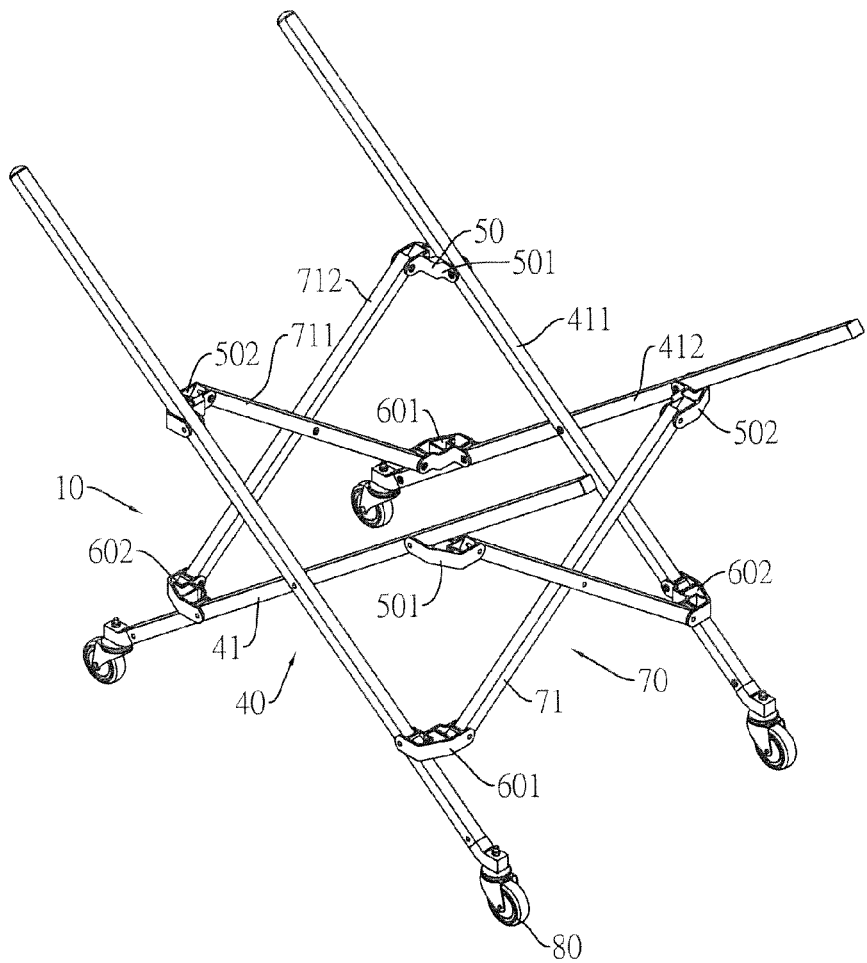
FIG. 3 is a perspective view of a frame of the folding ball trolley in FIG. 1.

With reference to FIGS. 1 to 3, the frame 10 has two main rod assemblies 40, four top seats 50, four bottom seats 60, two connecting rod assemblies 70, and four wheels 80.

The main rod assemblies 40 are arranged apart from each other, and each main rod assembly 40 has two main rods 41 pivotally connected to each other.

Figure 4:
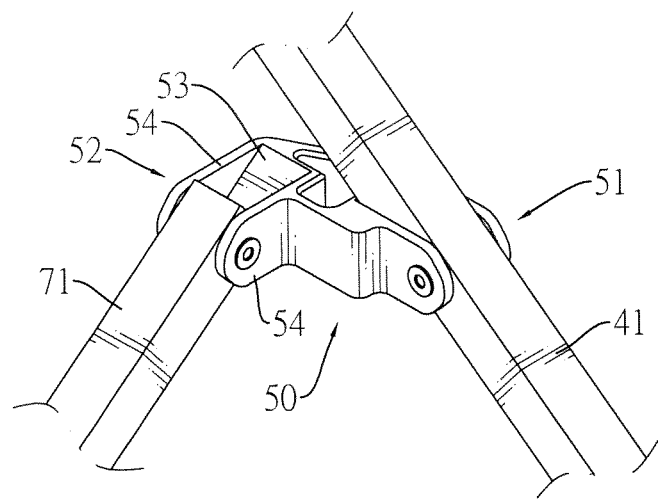
FIG. 4 is a perspective view of a top seat, a main rod and a connecting rod of the folding ball trolley in FIG. 1.
Figure 5:
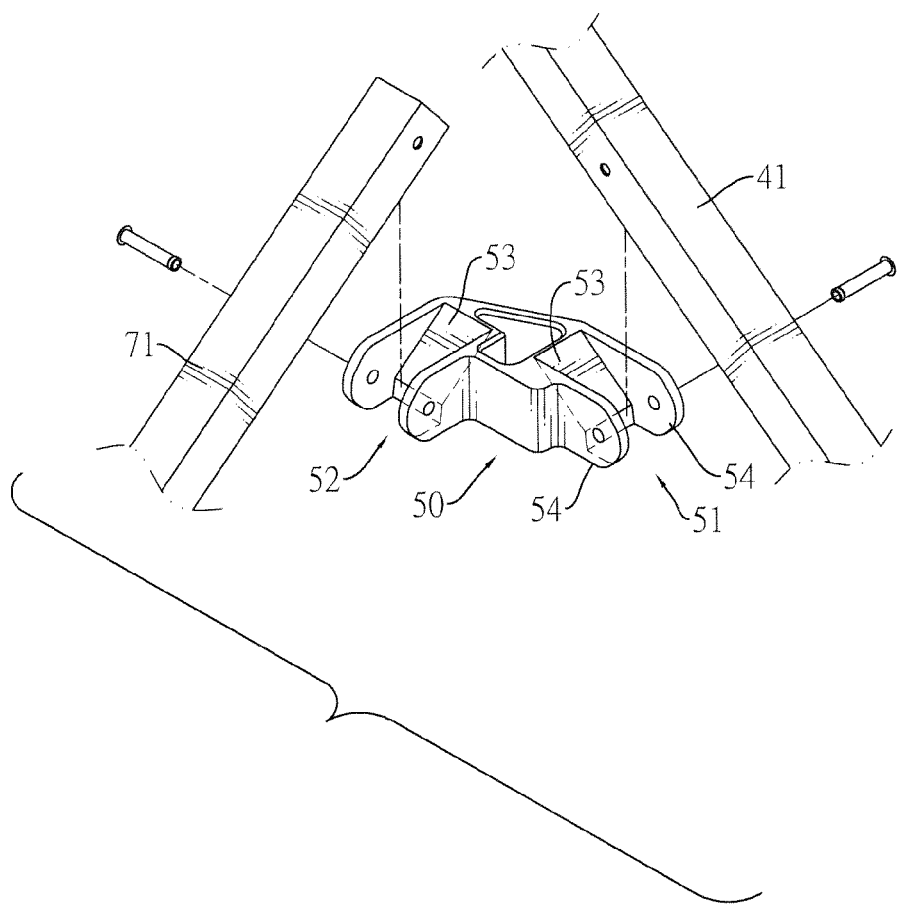
FIG. 5 is an exploded perspective view of the top seat, the main rod and the connecting rod of the folding ball trolley in FIG. 1.

With reference to FIGS. 3 to 5, the top seats 50 are respectively and pivotally mounted on the four main rods 41 of the main rod assemblies 40. Each top seat 50 has a top long segment 51, a top short segment 52, two top abutting surfaces 53, and four pivot walls 54. The top long segment 51 and the top short segment 52 are perpendicularly connected to each other. The top abutting surfaces 53 are respectively disposed in an end of the top long segment 51 and an end of the top short segment 52. The top abutting surfaces 53 are disposed in directions perpendicular to each other, as the top long segment 51 and the top short segment 52 are perpendicularly connected to each other. Each top abutting surface 53 is inclined downward. Two of the pivot walls 54 of the top seat 50 are respectively disposed in opposite sides of one of the top abutting surfaces 53. The other two pivot walls 54 are respectively disposed in opposite sides of the other top abutting surface 53. The main rod 41 is pivotally connected between the pivot walls 54 of one of the top abutting surfaces 53 of the top seat 50, and selectively abuts said abutting surface 53.

Figure 6:
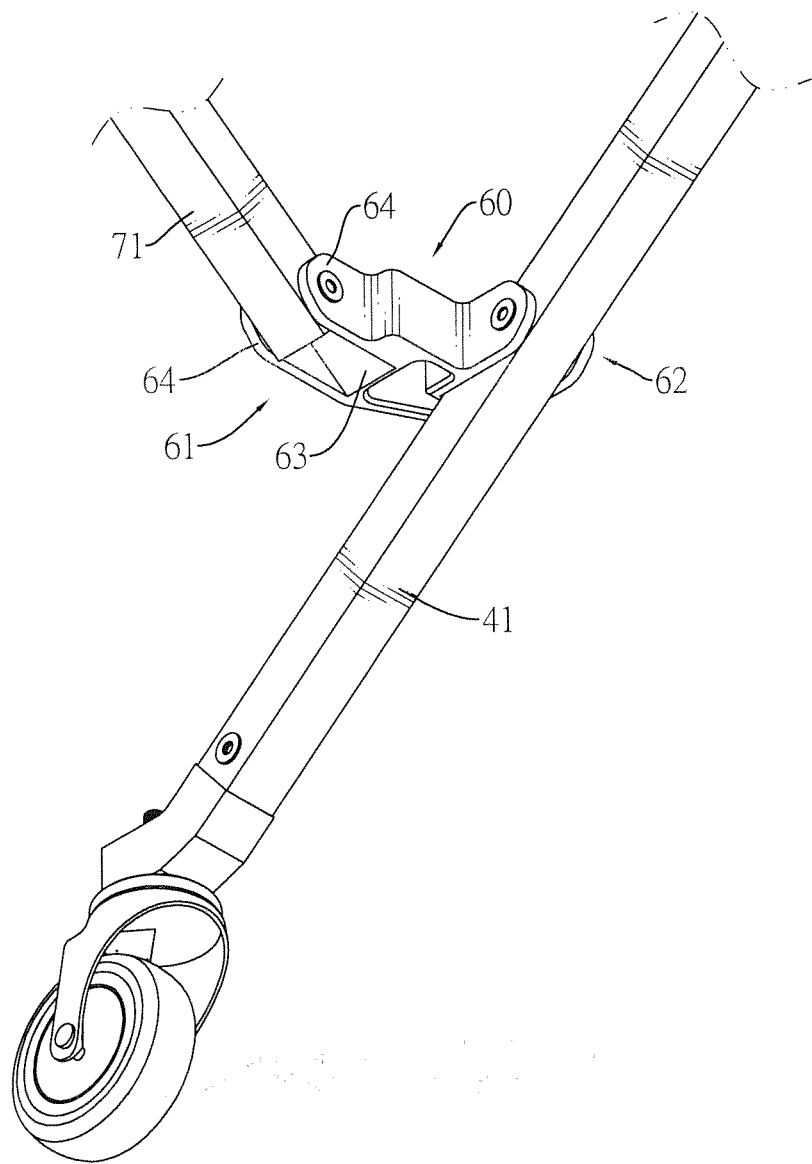
FIG. 6 is a perspective view of a bottom seat, the main rod and the connecting rod of the folding ball trolley in FIG. 1.
Figure 7:
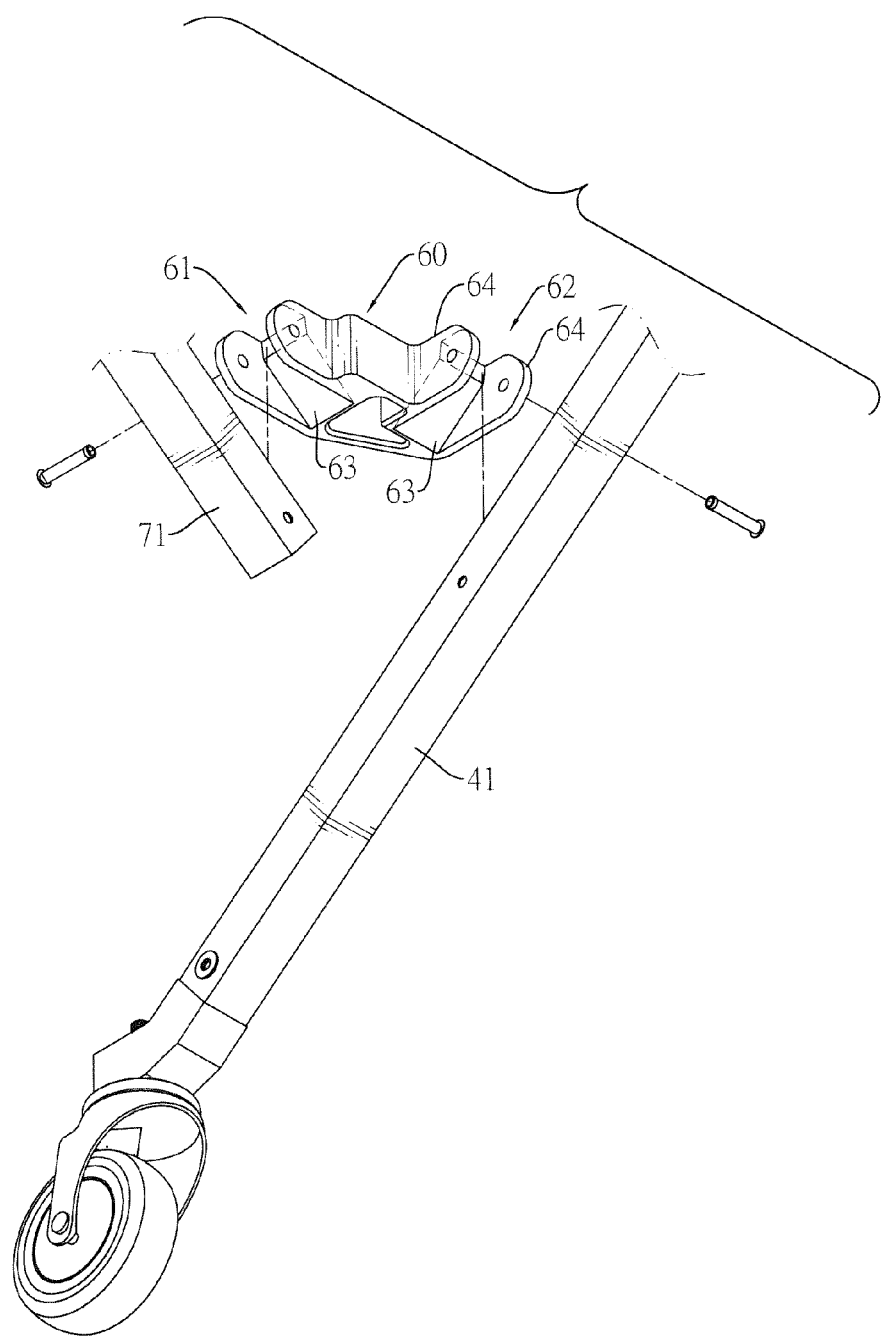
FIG. 7 is an exploded perspective view of the bottom seat, the main rod and the connecting rod of the folding ball trolley in FIG. 1.

With reference to FIGS. 3, 6 and 7, the bottom seats 60 are respectively and pivotally mounted on the four main rods 41 of the main rod assemblies 40, and disposed below the top seats 50. Each bottom seat 60 has a bottom long segment 61, a bottom short segment 62, two bottom abutting surfaces 63, and four pivot walls 64. The bottom long segment 61 and the bottom short segment 62 are perpendicularly connected to each other. The bottom abutting surfaces 63 are respectively disposed in an end of the bottom long segment 61 and an end of the bottom short segment 62. The bottom abutting surfaces 63 are disposed in directions perpendicular to each other, as the bottom long segment 61 and the bottom short segment 62 are perpendicularly connected to each other. Each bottom abutting surface 63 is inclined upward. Two of the pivot walls 64 of the bottom seat 60 are respectively disposed in opposite sides of one of the bottom abutting surfaces 63. The other two pivot walls 64 are respectively disposed in opposite sides of the other bottom abutting surface 63. The main rod 41 is pivotally connected between the pivot walls 64 of one of the bottom abutting surfaces 63 of the bottom seat 60, and selectively abuts said abutting surface 63. In a preferred embodiment, the top seats 50 and the bottom seats 60 are identical in structure but having different installation directions.

Figure 8:
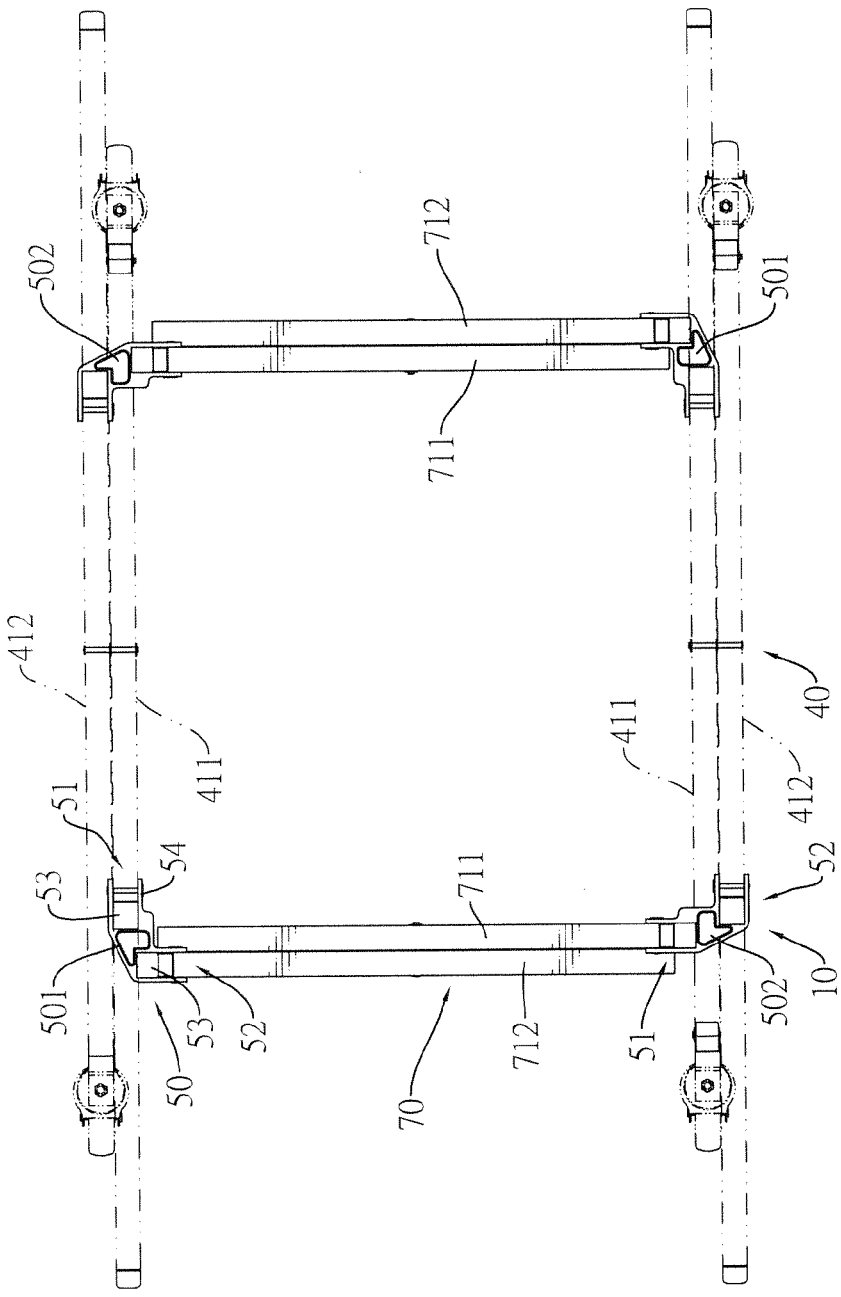
FIG. 8 is a top view of the top seats of the folding ball trolley in FIG. 1.

With reference to FIGS. 3, 5, 7 and 8, the connecting rod assemblies 70 are mounted between the main rod assemblies 40. and are arranged apart from each other. The main rod assemblies 40 and the connecting rod assemblies 70 are arranged into a rectangle as shown in FIG. 8. Each connecting rod assembly 70 has two connecting rods 71 pivotally connected to each other. Each connecting rod 71 has a top end and a bottom end. The top end of the connecting rod 71 is pivotally connected to one of the top seats 50 on one of the main rod assemblies 40, is pivotally mounted between the pivot walls 54 of the top abutting surface 53 that does not abut the main rod 41 of said top seat 50, and selectively abuts said top abutting surface 53. The bottom end of the connecting rod 71 is pivotally connected to one of the bottom seats 60 on the other main rod assembly 40, is pivotally mounted between the pivot walls 64 of the bottom abutting surface 63 that does not abut the main rod 41 of said bottom seat 60, and selectively abuts said bottom abutting surface 63.

With reference to FIGS. 4 and 6, in a preferred embodiment, the main rods 41 and the connecting rods 71 are pivotally connected to the top seats 50 and the bottom seats 60 by, but not limited to, rivets. With reference to FIGS. 3, 4 and 6, in the preferred embodiment, the main rods 41 and the connecting rods 71 are square tubes made by aluminum extrusion. Thus, the main rods 41 and the connecting rods 71 conveniently abut the top abutting surfaces 53 and the bottom abutting surfaces 63, and have advantages such as convenience in manufacture, light weight, and rust resistance.

Figure 10:
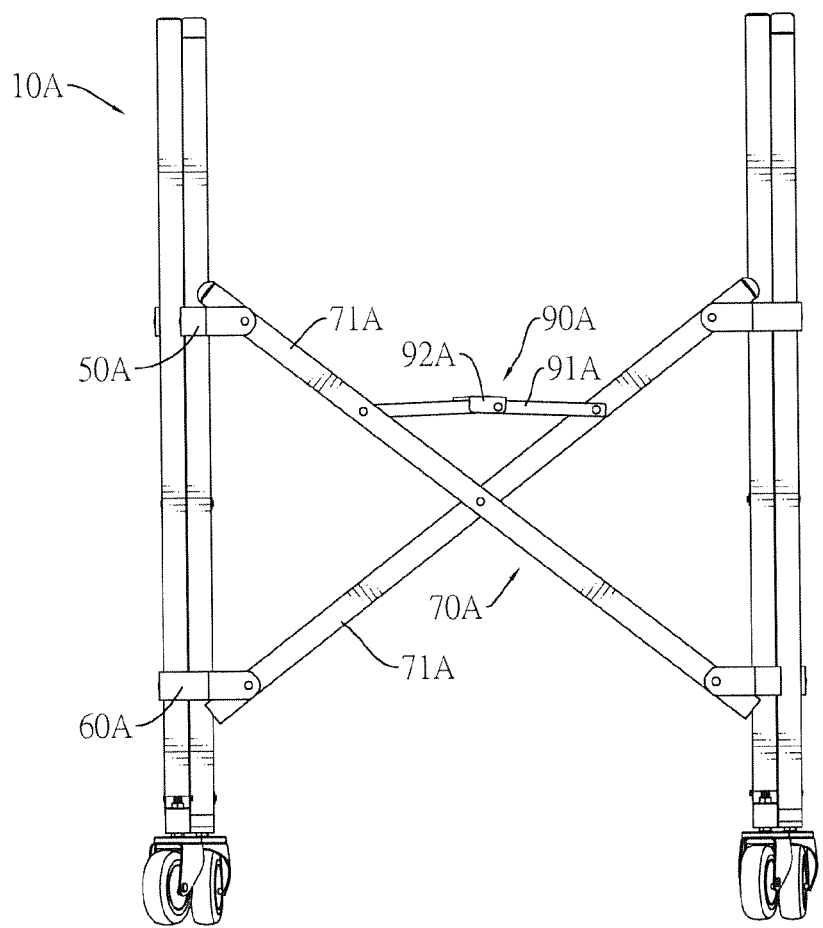
FIG. 10 is a side view of the folding ball trolley of another embodiment in accordance with the present invention.

With reference to FIGS. 4 and 6, in a preferred embodiment, the top end and the bottom end of the connecting rod 71, do not protrude out of the top seat 50 and the bottom seat 60. With reference to FIG. 10, in another embodiment, the top end and the bottom end of the connecting rod 71A protrude out of the top seat 50A and the bottom seat 60A.

With reference to FIGS. 3 and 8, the two main rods 41 of each main rod assembly 40 are respectively an inner main rod 411 and an outer main rod 412. The two connecting rods 71 of each connecting rod assembly 70 are respectively an inner connecting rod 711 and an outer connecting rod 712.

The four top seats 50 respectively are two first top seats 501 and two second top seats 502. The first top seats 501 are disposed diagonally opposite to each other. The second top seats 502 are disposed diagonally opposite to each other. The top long segment 51 and the top short segment 52 of each first top seat 501 are respectively and pivotally connected to the inner main rod 411 on which the first top seat 501 is mounted and the outer connecting rod 712 connected to the first top seat 501. The top long segment 51 and the top short segment 52 of each second top seat 502 are respectively and pivotally connected to the inner connecting rod 711 connected to the second top seat 502 and the outer main rod 412 on which the second top seat 502 is mounted.

The four bottom seats 60 respectively are two first bottom seats 601 and two second bottom seats 602. The first bottom seats 601 are disposed diagonally opposite to each other. The second bottom seats 602 are disposed diagonally opposite to each other. The bottom long segment 61 and the bottom short segment 62 of each first bottom seat 601 are respectively and pivotally connected to the inner connecting rod 711 connected to the first bottom seat 601 and the outer main rod 412 on which the first bottom seat 601 is mounted. The bottom long segment 61 and the bottom short segment 62 of each second bottom seat 602 are respectively and pivotally connected to the inner main rod 411 on which the second bottom seat 602 is mounted and the outer connecting rod 712 connected to the second bottom seat 602. The first top seats 501 are respectively disposed aligned with and above the first bottom seats 601.

With reference to FIG. 1, the wheels 80 are respectively mounted on bottom ends of the four main rods 41 of the main rod assemblies 40.

With reference to FIGS. 1 to 3, the bag 20 is mounted on the frame 10, is connected to the main rods 41 of the main rod assemblies 40, is rectangular in outline when expanded, and has an inner space, an opening, a first outer surface, a second outer surface, and four mounting segments 21. The first outer surface and the second outer surface are opposite to each other. Two of the mounting segments 21 are mounted facing to each other on the first outer surface, and the other two mounting segments 21 are mounted facing to each other on the second outer surface. Each mounting segment 21 is elongated, is inclined downward from an outer end to an inner end, and has an inner space and an opening. The main rods 41 are respectively mounted in the mounting segments 21 of the bag 20 through the openings of the mounting segments 21.

Figure 9:
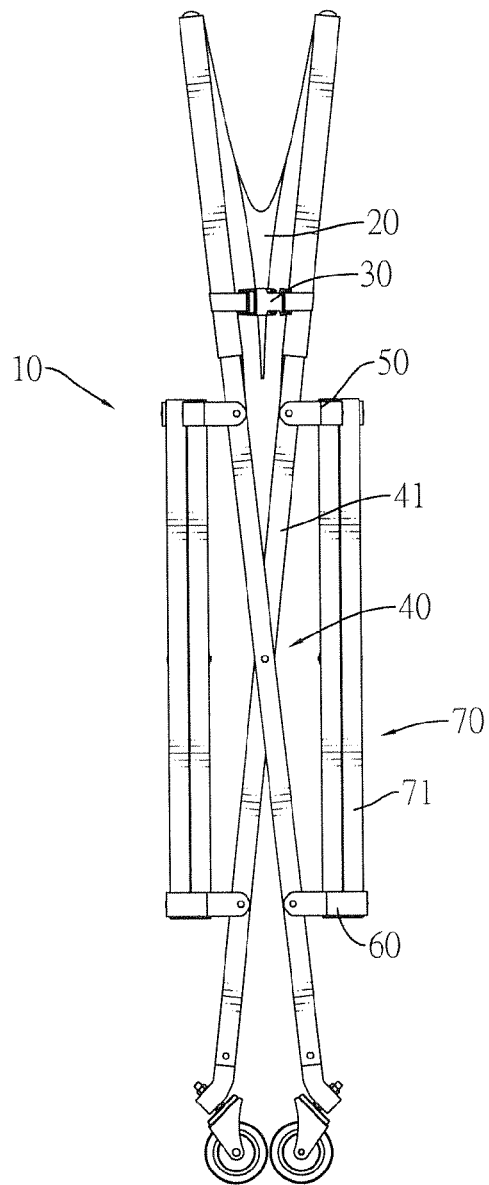
FIG. 9 is a front view of the folding ball trolley in FIG. 1, showing the folding ball trolley folded.
Figure 11:
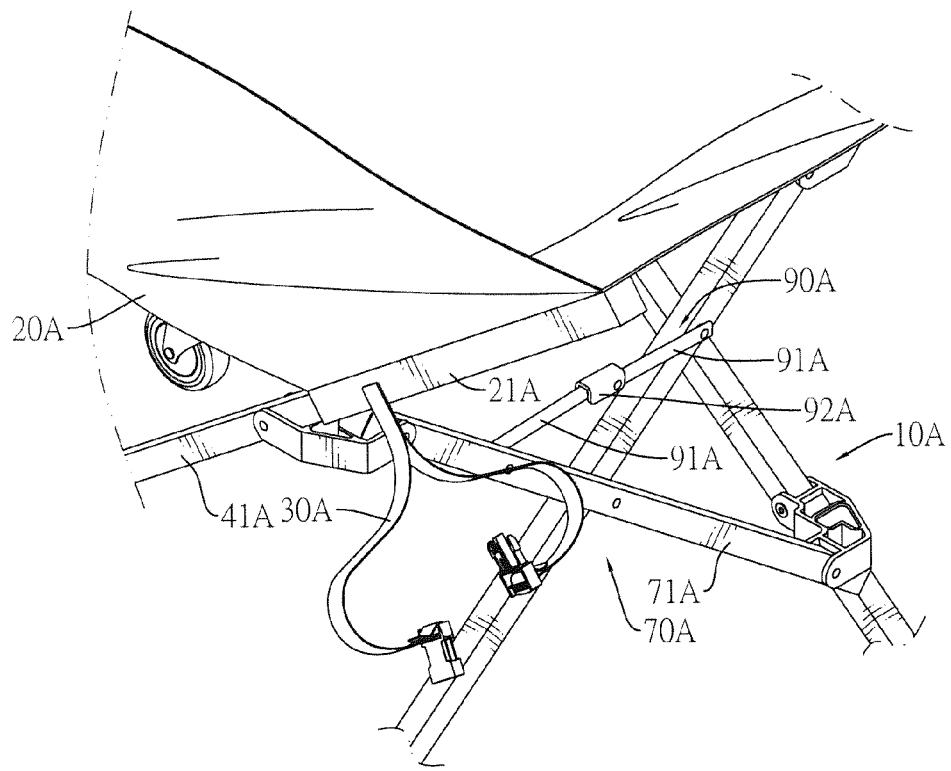
FIG. 11 is an enlarged perspective view of the folding ball trolley of another embodiment in accordance with the present invention.
Figure 12:
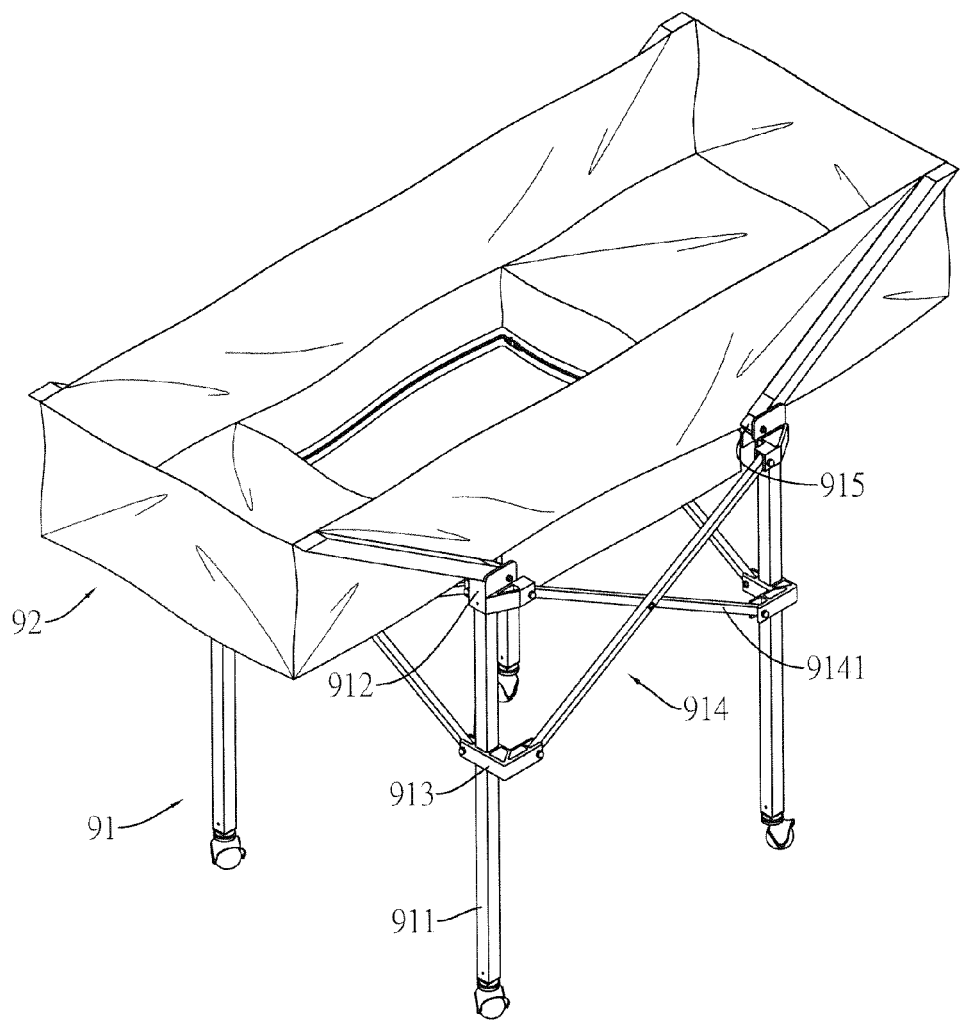
FIG. 12 is a perspective view of a conventional folding ball trolley in accordance with the prior art.

With reference to FIGS. 1, 2 and 9, the fastening belt 30 is mounted on the bag 20 and selectively surrounds and fastens the four main rods 41 of the frame 10. In a preferred embodiment, two ends of the fastening belt 30 selectively engage with each other. The fastening belt 30 is mounted securely on one of the mounting segments 21 of the bag 20, and is disposed on an inner side relative to the main rod 41. With reference to FIG. 11, in another embodiment, the fastening belt 30A is mounted securely on one of the mounting segments 21A of the bag 20A, but is disposed on an outer side relative to the main rod 41A.

With reference to FIGS. 2 and 9, to expand the folding ball trolley as described from a folded condition, a user just unfastens the fastening belt 30, which ties the main rods 41 of the frame 10 in the folded condition. Then, the main rods 41 and the connecting rods 71, which slightly lean outward when folded, gradually lean further outward under gravity until each main rod 41 leans against the top abutting surface 53 of the top seat 50 and the bottom abutting surface 63 of the bottom seat 60 as shown in FIGS. 2 and 4, and each connecting rod 71 leans against the top abutting surface 53 of the top seat 50 and the bottom abutting surface 63 of the bottom seat 60 as shown in FIGS. 2 and 6. Thus, the main rods 41 and the connecting rods 71 are held at a specific angle.

The main rod assemblies 40 and the connecting rod assemblies 70 are pivotally connected to each other into a rectangle, such that the frame 10 is expanded horizontally when the main rods 41 and the connecting rods 71 are leant outward. Simultaneously, the bag 20 is braced up by the main rods 41. Accordingly, the folding ball trolley is auto-expanded when the fastening belt 30 is unfastened, which is convenient in use. When the folding ball trolley is folded, the user does not have to resist any other external force, since the folding ball trolley is expanded only by gravity.

With reference to FIGS. 1 and 3, in addition, the main rods 41 and the connecting rods 71 are held at the specific angle by abutting on the top seats 50 and the bottom seats 60, thereby preventing the mounting segments 21 of the bag 20 from bearing too much force applied by the main rods 41, which may tear and break the bag 20. In addition, when the user assembles the bag 20 on the main rods 41 in the first time of assembling, the user can first expand the frame 10 as shown in FIG. 3. The main rods 41 have been held at the specific angle, such that the user does not have to hold the main rods 41 to prevent the frame 10 from self rotating and toppling down when the user is mounting the mounting segments 21 of the bag 20 on the main rod 41.

Furthermore, the amount of the rods of the folding ball trolley is reduced to eight (four main rods 41 and four connecting rods 71), which reduces the manufacturing cost and facilitates ease of assembly.

The folding ball trolley can function without any sliding seat as conventional folding ball trolley, thereby preventing unsmooth movement of the folding ball trolley during expansion and folding.

In another embodiment, each top seat may have only one top abutting Surface, and each bottom seat also has only one bottom abutting surface, the only one top abutting surface and the only one bottom abutting surface are abutted by the main rods, and the connecting rods are simply pivotally mounted between the pivot walls. Although the connecting rods cannot be held at the specific angle by abutting the top seat and the bottom seat, the positions of the top seat and the bottom seat are fixed when the angles of the main rods are fixed, such that the angles of the connecting rods are fixed. Accordingly, the frame of the folding ball trolley of this embodiment also can automatically fix its angle by itself.

Alternatively, the only one top abutting surface and the only one bottom abutting surface are abutted by the connecting rods, and the main rods are simply pivotally mounted between the pivot walls. The folding ball trolley with the modification also can make the frame fix its angle by itself.

With reference to FIGS. 10 and 11, in another embodiment, the folding ball trolley further has two engaging rod assemblies 90A respectively mounted on the connecting rod assemblies 70A. Each engaging rod assembly 90A has two engaging rods 91A and an engager 92A. Outer ends of the engaging rods 91A are respectively and pivotally connected to the connecting rods 71A of the connecting rod assembly 70A. Inner ends of the engaging rods 91A are pivotally connected to each other. The engager 92A is pivotally connected to the inner end of one of the engaging rods 91A, and selectively engages with the inner end of the other engaging rod 91A.

When the frame 10A is expanded, the engaging rods 91A are rotated to become almost collinear. At this time, the engager 92A is slightly pressed down to lower the connecting junction of the engaging rods 91A and to make the engager 92A abut the engaging rods 91A, which stops the frame 10A from being inward folded. As a result, the engager 92A prevents the frame 10A from being folded by slight external force when in use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A folding ball trolley comprising:
a frame having
two main rod assemblies arranged apart from each other; each main rod assembly having
two main rods pivotally connected to each other;
four top seats respectively and pivotally mounted on the four main rods of the main rod assemblies;
four bottom seats respectively and pivotally mounted on the four main rods of the main rod assemblies, and disposed below the top seats;
two connecting rod assemblies mounted between the main rod assemblies, and arranged apart from each other; the main rod assemblies and the connecting rod assemblies connected into a rectangle; each connecting rod assembly having
two connecting rods pivotally connected to each other; each connecting rod having
a top end pivotally connected to one of the top seats on one of the main rod assemblies; and
a bottom end pivotally connected to one of the bottom seats on the other main rod assembly; and
four wheels respectively mounted on bottom ends of the four main rods of the main rod assemblies; and
a bag mounted on the frame, connected to the main rods of the main rod assemblies, and having an inner space and an opening;
wherein
each top seat has
a top abutting surface inclined downward, and selectively abutting the main rod on which the top seat is mounted; and
each bottom seat has a bottom abutting surface inclined upward, and selectively abutting the main rod on which the bottom seat is mounted.

2. A folding ball trolley comprising:
a frame having
two main rod assemblies arranged apart from each other; each main rod assembly having
two main rods pivotally connected to each other;
four top seats respectively and pivotally mounted on the four main rods of the main rod assemblies;
four bottom seats respectively and pivotally mounted on the four main rods of the main rod assemblies, and disposed below the top seats;
two connecting rod assemblies mounted between the main rod assemblies, and arranged apart from each other; the main rod assemblies and the connecting rod assemblies connected into a rectangle; each connecting rod assembly having
two connecting rods pivotally connected to each other; each connecting rod having
a top end pivotally connected to one of the top seats on one of the main rod assemblies; and
a bottom end pivotally connected to one of the bottom seats on the other main rod assembly; and
four wheels respectively mounted on bottom ends of the four main rods of the main rod assemblies; and
a bag mounted on the frame, connected to the main rods of the main rod assemblies, and having an inner space and an opening;
wherein
each top seat has
a top abutting surface inclined downward, and selectively abutting the connecting rod connected to the top seat; and
each bottom seat has
a bottom abutting surface inclined upward, and selectively abutting the connecting rod connected to the bottom seat.

3. A folding ball trolley comprising:
a frame having
two main rod assemblies arranged apart from each other; each main rod assembly having
two main rods pivotally connected to each other;
four top seats respectively and pivotally mounted on the four main rods of the main rod assemblies;
four bottom seats respectively and pivotally mounted on the four main rods of the main rod assemblies, and disposed below the top seats;
two connecting rod assemblies mounted between the main rod assemblies, and arranged apart from each other; the main rod assemblies and the connecting rod assemblies connected into a rectangle; each connecting rod assembly having
two connecting rods pivotally connected to each other; each connecting rod having
a top end pivotally connected to one of the top seats on one of the main rod assemblies; and
a bottom end pivotally connected to one of the bottom seats on the other main rod assembly; and
four wheels respectively mounted on bottom ends of the four main rods of the main rod assemblies; and
a bag mounted on the frame, connected to the main rods of the main rod assemblies, and having an inner space and an opening;
wherein
each top seat has
two top abutting surfaces inclined downward; one of the top abutting surfaces selectively abutting the main rod on which the top seat is mounted; the other top abutting surface selectively abutting the connecting rod connected to the top seat; and
each bottom seat has
two bottom abutting surfaces inclined upward; one of the bottom abutting surfaces selectively abutting the main rod on which the bottom seat is mounted; the other bottom abutting surface selectively abutting the connecting rod connected to the bottom seat.

4. The folding ball trolley as claimed in claim 3, wherein
each top seat has
four pivot walls; two of the pivot walls of the top seat respectively disposed in opposite sides of one of the top abutting surfaces, and pivotally connected to the main rod on which the top seat is mounted; the other two pivot walls of the top seat respectively disposed in opposite sides of the other top abutting surface, and pivotally connected to the connecting rod connected to the top seat; and
each bottom seat has
four pivot walls; two of the pivot walls of the bottom seat respectively disposed in opposite sides of one of the bottom abutting surfaces, and pivotally connected to the main rod on which the bottom seat is mounted; the other two pivot walls of the bottom seat respectively disposed in opposite sides of the other bottom abutting surface, and pivotally connected to the connecting rod connected to the bottom seat.

5. The folding ball trolley as claimed in claim 3, wherein
each top seat has a top long segment and a top short segment perpendicularly connected to each other; the top abutting surfaces of the top seat are respectively disposed in an end of the top long segment and an end of the top short segment; the four top seats respectively are two first top seats and two second top seats; the first top seats are disposed diagonally opposite to each other; the second top seats are disposed diagonally opposite to each other;
the top long segment and the top short segment of each first top seat are respectively and pivotally connected to the main rod on which the first top seat is mounted and the connecting rod connected to the first top seat;
the top long segment and the top short segment of each second top seat are respectively and pivotally connected to the connecting rod connected to the second top seat and the main rod on which the second top seat is mounted;
each bottom seat has a bottom long segment and a bottom short segment perpendicularly connected to each other; the bottom abutting surfaces of the bottom seat are respectively disposed in an end of the bottom long segment and an end of the bottom short segment; the four bottom seats respectively are two first bottom seats and two second bottom seats; the first bottom seats are disposed diagonally opposite to each other; the second bottom seats are disposed diagonally opposite to each other;
the bottom long segment and the bottom short segment of each first bottom seat are respectively and pivotally connected to the connecting rod connected to the first bottom seat and the main rod on which the first bottom seat is mounted;
the bottom long segment and the bottom short segment of each second bottom seat are respectively and pivotally connected to the main rod on which the second bottom seat is mounted and the connecting rod connected to the second bottom seat; and the first top seats are respectively disposed aligned with and above the first bottom seats.

6. The folding ball trolley as claimed in claim 4, wherein each top seat has a top long segment and a top short segment perpendicularly connected to each other; the top abutting surfaces of the top seat are respectively disposed in an end of the top long segment and an end of the top short segment; the four top seats respectively are two first top seats and two second top seats; the first top seats are disposed diagonally opposite to each other; the second top seats are disposed diagonally opposite to each other;

the top long segment and the top short segment of each first top seat are respectively and pivotally connected to the main rod on which the first top seat is mounted and the connecting rod connected to the first top seat;

the top long segment and the top short segment of each second top seat are respectively and pivotally connected to the connecting rod connected to the second top seat and the main rod on which the second top seat is mounted;

each bottom seat has a bottom long segment and a bottom short segment perpendicularly connected to each other; the bottom abutting surfaces of the bottom seat are respectively disposed in an end of the bottom long segment and an end of the bottom short segment; the four bottom seats respectively are two first bottom seats and two second bottom seats; the first bottom seats are disposed diagonally opposite to each other; the second bottom seats are disposed diagonally opposite to each other;

the bottom long segment and the bottom short segment of each first bottom seat are respectively and pivotally connected to the connecting rod connected to the first bottom seat and the main rod on which the first bottom seat is mounted;

the bottom long segment and the bottom short segment of each second bottom seat are respectively and pivotally connected to the main rod on which the second bottom seat is mounted and the connecting rod connected to the second bottom seat; and the first top seats are respectively disposed aligned with and above the first bottom seats.

7. The folding ball trolley as claimed in claim 3, wherein the top seats and the bottom seats are the same in structure.

8. The folding ball trolley as claimed in claim 6, wherein the top seats and the bottom seats are the same in structure.

9. The folding ball trolley as claimed in claim 3 further comprising two engaging rod assemblies respectively mounted on the connecting rod assemblies; each engaging rod assembly having two engaging rods and an engager; outer ends of the engaging rods respectively and pivotally connected to the connecting rods of the connecting rod assembly; inner ends of the engaging rods pivotally connected to each other; the engager pivotally connected to one of the engaging rods, and selectively engaging with the other engaging rod.

10. The folding ball trolley as claimed in claim 8 further comprising two engaging rod assemblies respectively mounted on the connecting rod assemblies; each engaging rod assembly having two engaging rods and an engager; outer ends of the engaging rods respectively and pivotally connected to the connecting rods of the connecting rod assembly; inner ends of the engaging rods pivotally connected to each other; the engager pivotally connected to one of the engaging rods, and selectively engaging with the other engaging rod.

11. The folding ball trolley as claimed in claim 3, wherein the main rods and the connecting rods are square tubes.

12. The folding ball trolley as claimed in claim 10, wherein the main rods and the connecting rods are square tubes.

13. The folding ball trolley as claimed in claim 3, wherein the main rods and the connecting rods are made by aluminum extrusion.

14. The folding ball trolley as claimed in claim 12, wherein the main rods and the connecting rods are made by aluminum extrusion.

15. The folding ball trolley as claimed in claim 3, wherein the bag has
- a first outer surface;
- a second outer surface opposite to the first outer surface; and
- four mounting segments; two of the mounting segments mounted facing to each other on the first outer surface; the other two mounting segments mounted facing to each other on the second outer surface; each mounting segment being elongated, inclined downward from an outer end to an inner end and having an inner space and an opening; and the main rods are respectively mounted in the mounting segments of the bag.

16. The folding ball trolley as claimed in claim 14, wherein the bag has
- a first outer surface;
- a second outer surface opposite to the first outer surface; and
- four mounting segments; two of the mounting segments mounted facing to each other on the first outer surface; the other two mounting segments mounted facing to each other on the second outer surface; each mounting segment being elongated, inclined downward from an outer end to an inner end and having an inner space and an opening; and the main rods are respectively mounted in the mounting segments of the bag.

17. The folding ball trolley as claimed in claim 3 further comprising a fastening belt mounted on the bag and selectively surrounding and fastening the four main rods of the frame.

18. The folding ball trolley as claimed in claim 16 further comprising a fastening belt mounted on the bag and selectively surrounding and fastening the four main rods of the frame.

* * * * *